United States Patent [19]
Titus

[11] 3,852,641
[45] Dec. 3, 1974

[54] PROTECTIVE SYSTEM FOR MOBILE ELECTRIC POWER APPARATUS

[75] Inventor: Charles H. Titus, Newtown Square, Pa.

[73] Assignee: General Electric Company, Philadelphia, Pa.

[22] Filed: Feb. 5, 1973

[21] Appl. No.: 329,455

[52] U.S. Cl. ............................ 317/18 B, 317/18 C
[51] Int. Cl. .............................................. H02h 1/02
[58] Field of Search ........ 317/18 C, 18 B, 18 D, 52, 317/44; 324/51; 340/253 M, 253 N, 255, 256

[56] References Cited
UNITED STATES PATENTS

| | | | |
|---|---|---|---|
| 3,158,806 | 11/1964 | Conrad | 317/44 |
| 3,196,316 | 7/1965 | Crom | 317/18 C |
| 3,522,479 | 8/1970 | Parker | 317/18 C |
| 3,676,739 | 7/1972 | Neuhauser | 317/18 C |
| 3,729,653 | 4/1973 | Mankoff et al. | 317/18 C |

Primary Examiner—J. D. Miller
Assistant Examiner—Patrick R. Salce
Attorney, Agent, or Firm—J. Wesley Haubner

[57] ABSTRACT

In a mobile electric power apparatus, such as a mining machine to which high voltage ac power is supplied from a remote substation through a flexible cable, the frame of the machine is grounded at the substation through a ground conductor in the cable. Integrity of the ground conductor is continuously monitored by means of a low voltage dc current derived from the power circuit at the machine end through a potential transformer having a wye-connected primary. The potential transformer supplies a rectifier through a zig-zag autotransformer. A neutral-to-neutral connection between the zig-zag transformer and the potential transformer primary enables balanced return of monitor current through the power conductors.

4 Claims, 1 Drawing Figure

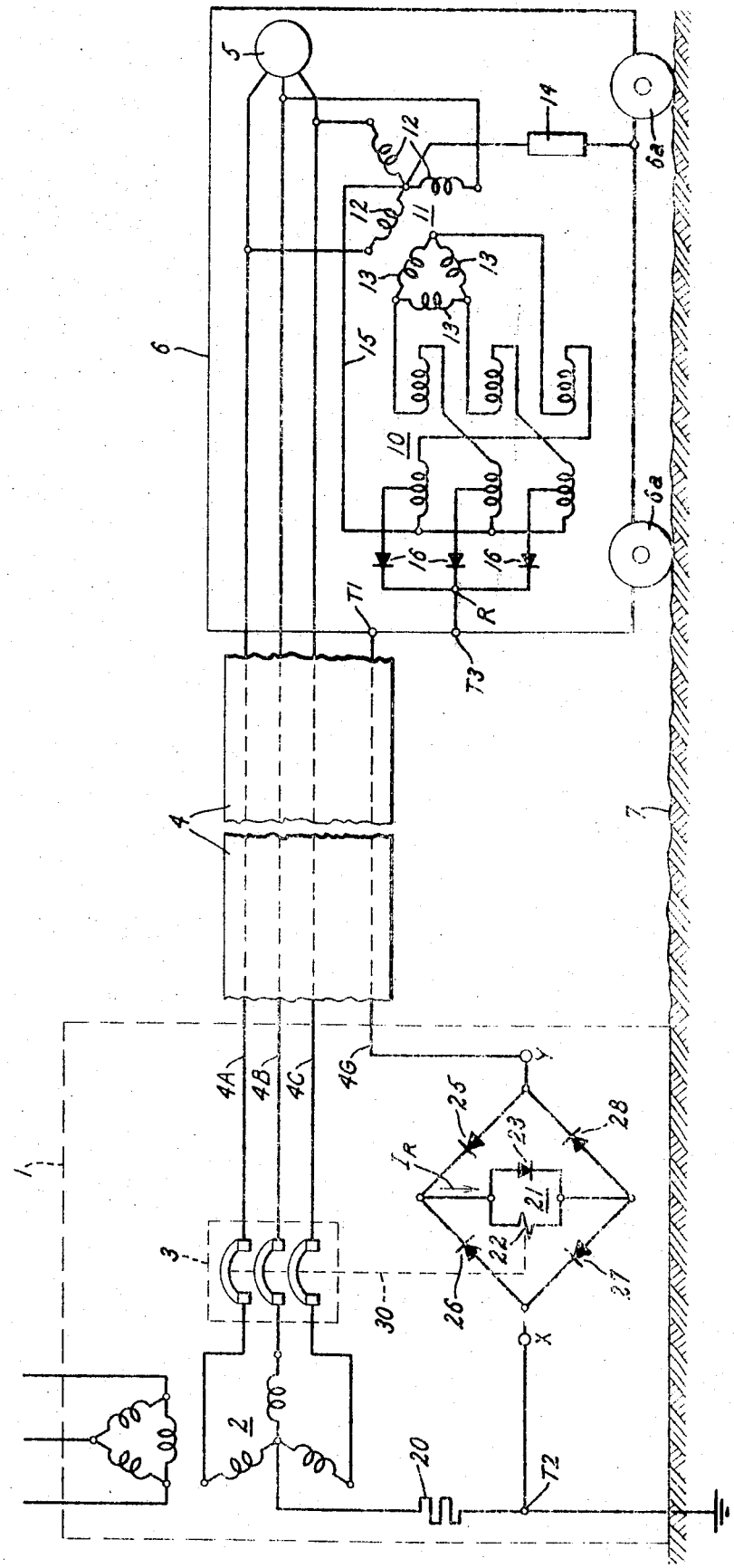

PROTECTIVE SYSTEM FOR MOBILE ELECTRIC POWER APPARATUS

My invention relates to protective circuits for mobile electric power apparatus, and particularly to improved means for monitoring the integrity of a ground wire included in a trailing cable through which electric power is supplied to mobile equipment. The following publications now known to applicant, illustrate previously known protective circuits of this general type:

U.S. Pat. No. 2,880,377-Buckingham et al.
U.S. Pat. No. 3,158,806-Conrad
U.S. Pat. No. 3,196,316-Crom
U.S. Pat. No. 3,335,324-Buckeridge
U.S. Pat. No. 3,522,479-Parker
U.S. Pat. No. 3,676,739-Neuhauser Where mobile electric power equipment is supplied from a fixed substation current may be conducted through vehicle tracks and trolleys or through a trailing power cable. If track or trolley conductors are not feasible or available, or if the equipment is used in an atmosphere where arcing is especially hazardous, as in underground mines, it is desirable to use a trailing power cable with one or more ground conductors attached to the machine frame and grounded at the substatron end. In such applications it is especially important to ensure integrity of the ground conductor so that the machine frame is never permitted to rise appreciably above ground potential.

Trailing cables for mobile power equipment frequently are subjected to rough treatment so that conductors and insulating casing may become broken or otherwise damaged. An open circuit or short circuit in a line conductor is readily detectable due to unbalanced current but does not necessarily produce arcing or shock hazard at the machine. A ground conductor on the other hand normally carries no current so that its breakage or disconnection normally is not readily apparent. Ground conductor breakage, however, is hazardous since the machine frame is then subject to rise in potential as a result of line conductor faults. Thus any discontinuity in the ground conductor creates substantial arc and shock hazard at the frame of a mobile machine. For this reason a number of systems have been devised for continuously monitoring the integrity of a ground conductor in an electric power cable.

Ground conductor monitor systems frequently provide for continuous passage through the ground conductor of a small signal current and include means for detecting absence of the signal current. Means must also be provided for generating the signal current. Desirably this is done by a transmitter, or signal generator, which derives power from the line conductors.

However, in supplying high utilization voltages, in the region of 500 to 15,000 volts, to multiphase alternating current load apparatus through a line having a floating neutral it is especially difficult to provide ground conductor monitoring without either providing a pilot wire return for the monitor circuit or subjecting the ground conductor to voltage rise above ground, as during switching or in the event of line-to-ground faults.

Accordingly therefore, it is a principal object of my invention to provide improved means for continuously monitoring the electrical integrity of a ground conductor in high voltage multiphase power systems having a floating neutral, but without requiring a pilot wire return for the monitor circuit.

It is a more particular object of my invention to provide a signal circuit transmitter for deriving a low voltage monitor signal directly from a multiphase power circuit through means providing both an artificial power system neutral and a return path for monitor current through the power conductors.

In carrying out my invention in one preferred embodiment I utilize a trailing power cable including a ground conductor to connect a high voltage (i.e., the order of 500 to 15,000 volts) source of alternating electric current supply at a fixed location, such as a substation, to a mobile power utilization apparatus, such as a mining machine. The ground conductor is connected at one end to the machine frame and is connected to a ground terminal at the fixed source location.

To continuously monitor the physical and electrical integrity of the ground conductor without requiring a pilot wire return circuit I provide a transmitter, or signal current generator, comprising a step-down potential transformer, a zig-zag autotransformer and a three phase rectifier, all mounted on the mobile machine. The three phase rectifier is supplied from taps on the zig-zag transformer windings and has one DC output terminal connected directly to the machine frame. The potential transformer primary is wye connected and its neutral point is connected directly to the zig-zag transformer neutral and through a current limiting impedance to the machine frame. At the source location the cable ground conductor is connected to ground through a low impedance relay and to the power system neutral through a current limiting impedance. Signal current return therefore, is through the power system neutral, the power conductors and the direct connection from neutral of the potential transformer to neutral of the zig-zag transformer.

My invention will be more fully understood and its several objects and advantages further appreciated by referring now to the following detailed specification taken in conjunction with the accompanying drawing wherein:

FIG. 1 is a schematic circuit diagram of a substation source and a mobile power utilization machine supplied through a trailing cable and including a ground conductor monitor circuit embodying my invention.

Referring now to the drawing, I have shown at FIG. 1 a mine load center, 1, including a three-phase power transformer having a wye connected secondary winding 2. The power transformer winding 2 is connected through a circuit breaker 3 and a flexible power cable 4, to a high voltage 3-phase motor 5, mounted upon a mobile machine 6. The power cable 4 is provided with three line conductors 4A, 4B and 4C and includes also a ground conductor 4G. By way of illustration the motor 5 may be supplied with electric power at line voltages of the order of 15,000 volts or more. The machine frame 6 is conductive and is mounted upon wheels 6a which may be insulated from ground by rubber tires or the like or may be directly in contact with the ground or with track rails.

In mines and other hazardous locations it is extremely important that the conductive frame of a mobile machine be maintained at all times at or very close to ground potential, even in the event that one of the power conductors 4A, 4B or 4C accidentally comes in contact with the frame. For this reason the machine frame is grounded through the cable conductor 4G, as by connecting the conductor 4G at one end to a terminal T1 on the frame 6 and at the other end to a fixed ground terminal T2 at the substation 1. It will be appreciated of course that serious shock or arcing hazard to operating personnel may arise if the ground conductor 4G becomes broken and thus leaves the machine frame 6 in an electrically floating state. The physical and electrical integrity of the ground conductor 4G, which normally carries no current, is of particular concern with mobile apparatus operating over rough terrain, such as an earthen surface 7, while dragging the power cable 4 and subjecting the cable to abrasion and repeated flexure.

In three phase electric power supplies to mobile apparatus such as the machine 6, it is undesirable to provide a neutral connection directly to the machine frame. A direct connection of the power system neutral to the frame 6 would create unacceptable shock and arcing hazard. Also such a connection may short circuit a ground monitor signal through actual ground and thus disable a monitor circuit. For this and other reasons the power system neutral is electrically floating at the machine 6 but is stabilized through a zig-zag connected transformer.

In the embodiment of my invention illustrated at FIG. 1 I provide a zig-zag transformer 10 connected to the power conductors 4A, 4B and 4C through a step-down potential transformer 11 having wye connected primary windings 12 and delta connected secondary windings 13. The neutral of the potential transformer primary winding circuut is connected to the machine frame 6 through a steeply non-linear resistor 14 having an inverse resistance-voltage characteristic. This resistance-voltage characteristic is such that under normal operating conditions the resistance of the nonlinear element 14 is very high, the voltage between the machine frame and the neutral of the primary windings 12 normally being very small because the neutral of the supply transformer windings 2 is grounded at the substation and the normal 3-phase currents are balanced. Thus under normal conditions the resistance between the machine frame 6 and the neutral of the potential transformer primary windings 12 is so high that the primary windings 12 operate substantially with a floating neutral. However, in a manner well known to those skilled in the art the voltage excursions of this neutral point under a normal condition are limited and the neutral is stabilized by means of the zig-zag transformer 10. Very large voltage exuursions of the neutral are limited by the non-linear resistor 14 in a manner well known to those skilled in the art. The neutral of the zig-zag transformer 10 is connected in accordance with my invention to the neutral of the potential transformer primary windings 12 and thus to the machine frame 6 through the non-linear resistor 14. The reason for not connecting the neutral of the zig-zag transformer 10 directly to the machine frame but connecting it instead through a conductor 15 to the neutral of the primary windings 12 will appear as the description of my novel monitor circuit proceeds.

I utilize the zig-zag grounding transformer 10 as a source of monitor signal current supplied continuously through the cable ground conductor 4G for the purpose of monitoring the electrical integrity of that conductor. To derive a unidirectional signal current I connect the three phase windings of the zig-zag transformer 10 as an autotransformer to supply three rectifier diodes 16 having a common positive output terminal R and I connect the terminal R to the machine frame 6 at a terminal T3. The zig-zag transformer neutral and the conductor 15 constitute the negative rectifier terminal.

At the substation end of the flexible cable 4 the neutral of the wye-connected secondary windings in the power transformer 2 is connected to the ground terminal T2 through a current limiting resistor 20 and thus to the cable ground conductor 4G. In series circuit relation between the substation end of the ground conductor 4G and the grounding terminal T2, I provide a low impedance signal detector, or relay, generally designated by the reference numeral 21 and comprising a relay coil 22 in shunt circuit relation with a unilateral conducting device or diode 23. In the embodiment of the invention illustrated at FIG. 1 current is supplied to the detector relay 21 always in a single predetermined direction by connecting it across the output terminals of a four diode rectifier bridge having input terminals X and Y and comprising four bridge-connected diodes 25, 26, 27 and 28. It will be understood that the terminals X, Y, the diode bridge and the detector relay 21 are included in the previously mentioned connection of the ground conductor 4G to the ground terminal T2.

It will now be observed that the signal current rectifiers 16 normally supply a low level unidirectional monitor current from the rectifier output terminal R through the machine frame terminals T3 and T1, the ground conductor 4G and the detector relay 21 to the ground terminal T2. Because of the normally high impedance of the non-linear resistor 14 interposed between the machine frame 6 and the power system neutral at the mobile machine the return circuit for this monitor current does not traverse the actual ground 7, but comprises instead the current limiting resistor 20 connected to neutral of the power transformer 2, the power conductors themselves, the primary potential transformer windings 12 and the neutral-to-neutral transformer connection 15 between the potential transformer neutral and the zig-zag transformer neutral at the mobile machine. The normally unidirectional signal current traversing this monitor circuit is derived from the power conductors through the zig-zag transformer 10 and normally traverses the detector relay 21 in the direction indicated by the arrow $I_R$. The purpose of the four diode rectifier bridge 25, 26, 27, 28 is primarily to ensure that stray currents from ground sources, or power currents resulting from line-to-ground faults at the machine, do not cancel or reverse the current traversing the detector relay 21. This bridge connection is more fully described and claimed in U.S. Pat. No. 3,746,929 filed by W. C. Kotheimer on Sept. 18, 1971 and assigned to the same assignee as the subject application.

It will now be evident that the detector relay 21 is normally energized by a unidirectional signal current, preferably of low magnitude, derived by rectification from the zig-zag transformer 10 and traversing the detector relay 21. By way of illustration, FIG. 1 indicates that the detector relay 21 is arranged when deenergized to trip the circuit breaker 3, this being illustrated schematically by the broken line 30. It will of course be understood by those skilled in the art that any other well known disabling or alarm means may be utilized responsive to deenergization of the detector relay 21.

The relay 21 is desirably a relay of low impedance so that the low level signal current normally traversing it will not raise the potential of the relay terminal Y appreciably above the ground potential of the relay terminal X. To ensure that no unusual high voltage excursion of the relay terminal Y occurs in the event of unbalanced power currents traversing the ground conductor 4G, the voltage drop across the relay coil 22 is limited by a parallel-connected diode 23 to which the coil voltage drop is applied in the forward direction of diode conductor. The diode 23 provides a low impedance path around the relay coil 22 for any fault currents of large magnitude and thus limits to a few volts the potential to which the machine frame 6 may be carried above the ground potential at terminal T2. While the inclusion of the recitifier bridge 25, 26, 27, 28 in a unidirectional ground monitor circuit is no part of my present invention, it will be evident to those skilled in the art that when such a bridge is utilized, as illustrated at FIG. 1, it ensures that current can pass through the relay coil 22 in only one direction even if the voltage across the relay terminals X, Y reverses for any reason. With such a bridge connection it is necessary to supply only a single clamping diode 23 across the relay coil.

It will now be observed that in operation, with normal balanced power current traversing the line conductors 4A, 4B and 4C the cable ground conductor 4G is continuously traversed only by the low level unidirectional signal current generated at the transmitter 10, 16. This signal current maintains the detector relay 21 is a normally energized or picked-up condition, so that the circuit breaker 3 remains closed. Reversals of current in the ground conductor 4G, as due to stray voltages or the imposition of alternating power currents upon the ground conductor, neither deenergize nor appreciably increase the voltage drop across the detector relay coil 22. The zig-zag transformer 10, having its neutral connected to the machine frame through the non-linear impedance 14, serves to stabilize the power system neutral in the event of any large voltage excussions due to power conductor faults. The zig-zag transformer serves also to balance the signal current return circuit among its three phase windings and thus prevents saturation of the zig-zag transformer by the unidirectional signal current. The non-linear resistor 14 operates not only to tie the neutral to the machine frame and thus to ground in the event of power system faults, but also to prevent short circuiting of the signal current through the earth 7. The provision of the neutral to neutral tie connector 15 provides a conductive signal return path in the case where a potential transformer 11 is utilized but does not interfere with other functions of the zig-zag transformer. Thus by utilizing the non-linear impedance 14 I enable the power conductors to be utilized as a return path for signal current and prevent shunting of this current through the earth, thereby dispensing with the need for a separate pilot wire return. The neutral to neutral connector 15 enables this circuit to be utilized for high voltage apparatus where a step-down potential transformer is required between the power conductors and the zig-zag transformer 10.

While I have described and illustrated a preferred embodiment of my invention by way of illustration many modifications would occur to those skilled in the art and I therefore wish to have it understood that I intend in the appended claims to cover all such modifications as fall within the true spirit and scope of my invention.

What I claim as new and desire to secure by Letters Patent of the United States is:

1. In a system for supplying three phase electric current through a power circuit including a flexible cable from a fixed source location to a mobile utilization apparatus having a conductive frame, a three phase power transformer at said source location having line and neutral terminals, a ground terminal at said source location conductively connected to said neutral terminal, said cable including line conductors connected to said line terminals and a ground conductor, an electrical load device carried by said conductive frame and having load terminals connected for energization to said line conductors, the electrical neutral of said load device normally floating at a voltage near ground potential under balanced load conditions, a potential transformer mounted on said frame and having wye-connected primary windings connected to said load terminals and secondary windings, said potential transformer primary windings having a neutral terminal normally floating electrically, a wye connected zig-zag autotransformer mounted on said frame, said zig-zag autotransformer having phase windings connected to said secondary windings and a neutral terminal conductively connected to said neutral terminal of said potential transformer primary windings, a three phase rectifier energized from intermediate voltage phase winding taps on said zig-zag transformer phase windings and having a common terminal connected to said conductive frame, means connecting one end of said ground conductor to said frame, and means including a low impedance signal relay connecting the other end of said ground conductor to said ground terminal at said source location, whereby a unidirectional monitor signal current supplied by said rectifier normally traverses said ground conductor and said relay and follows a return path through said power transformer neutral terminal and the neutral terminal and phase windings of said zig-zag transformer.

2. An electric current supply system according to claim 1 wherein the neutral terminal of said zig-zag transformer is connected to said conductive frame through a non-linear resistor having a steeply inverse resistance-voltage characteristic.

3. An electric current supply system according to claim 1 wherein a current limiting resistor is interposed between said ground terminal and said power transformer neutral terminal at said source location, and said signal relay is positioned at said source location with one terminal connected directly to said ground terminal.

4. An electric current supply system according to claim 3 wherein said signal relay comprises an actuating coil having a diode rectifier connected in shunt relation therewith and poled to conduct in its forward direction said unidirectional signal current.

* * * * *